3,072,987
CONNECTOR
Alva B. Winters, Golf, Ill., assignor to Revere Electric Manufacturing Company, a corporation of Delaware
Filed June 9, 1961, Ser. No. 116,027
4 Claims. (Cl. 24—73)

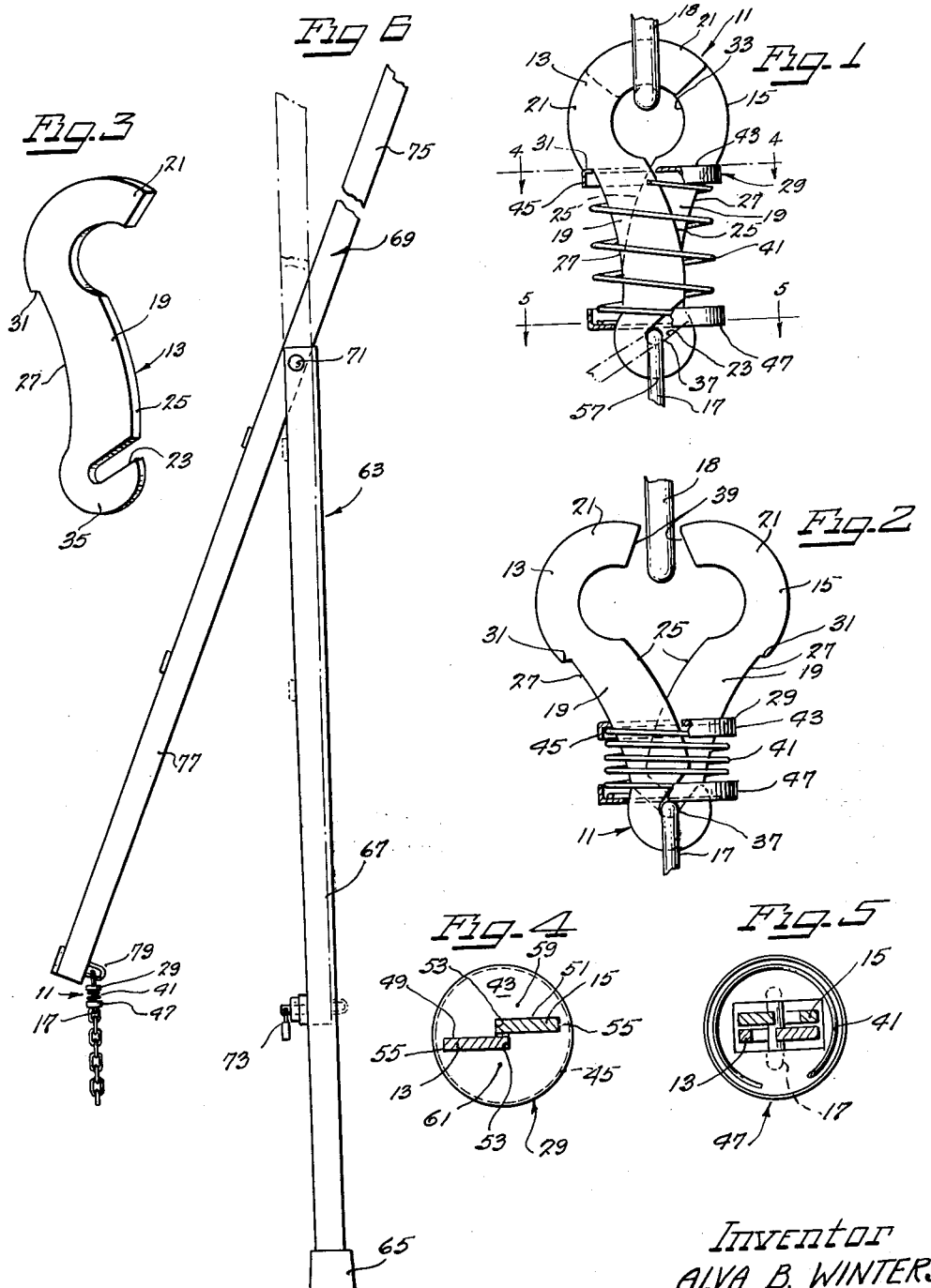

This invention relates to connectors, and in particular to releasable connectors which are biased toward a closed position.

The principal object of the present invention is to provide an improved connector of the type which is biased toward a closed position, but is manually releasable.

An additional object of the invention is to provide such a connector which will remain closed under load, regardless of the direction of the forces to which it may be subjected, but which can be easily opened when desired. A further object of the invention is to provide a connector which can be assembled with one link of a chain, or with segment of cable, and remain permanently attached to the chain or cable while assembled, but which can be easily disassembled and detached when desired.

Other objects and advantages of the invention will become apparent with reference to the following description and accompanying drawings.

In the drawings:

FIGURE 1 is a view of a connector in accordance with the present invention as it appears in the closed or locked position;

FIGURE 2 is a view of the connector of FIGURE 1 as it appears in the open position;

FIGURE 3 is a perspective view of one element of the connector of FIGURE 1;

FIGURE 4 is a sectional view taken along line 4—4 of FIGURE 1;

FIGURE 5 is a sectional view taken along line 5—5 of FIGURE 1; and

FIGURE 6 is a fragmentary view of one application of the connector of FIGURE 1.

Referring now to the drawings, a connector 11 in accordance with the invention comprises a pair of hooks 13 and 15 each pivoted on the same chain link or segment of cable 17, and movable thereon toward and away from each other between a closed position, as shown in FIGURE 1, and an open position, as shown in FIGURE 2. The hooks are adapted to engage a hasp, cable, rod, or other chain link 18, and, as will be shown, to remain so engaged under load, but to be quick-detachable as needed.

The hooks 13 and 15 are identical to one another and conveniently formed from flat stock as shown in FIGURE 3. Each hook includes an elongated shank portion 19, having at one end an arcuate arm 21 and at its other end a round-bottom slot 23 to receive the chain-like pivot.

Each shank 19 is formed so as to provide a pair of nearly parallel opposed camming edge surfaces 25 and 27, each of which is gently curved and inclined relative to the load axis of the connector. The camming surfaces 25 and 27 cooperate with a camming plate 29 soon to be described, which, when moved axially of the connector, opens or closes the hooks. Movement of the camming plate 29 upwardly along each shank 19 away from the pivot of the hooks, is limited by a stop shoulder 31 on the outside camming surface 27 near the upper end of the shank 19.

The arm 21 of the shank 19 is generally C-shaped and provided with a substantial return lip or nose to form a cradle 33 for the loop of a hasp, for example, or the link of a chain. The pivot end of the shank is slightly enlarged to form a boss 35 into which the pivot slot 23 extends at an acute angle to the load axis of the connector. The slot 23 is of such a width as to freely accommodate a link of the chain 17.

When the connector is in an assembled condition, as shown in FIGURES 1 and 2, the inner ends of the pivot slots 23 overlap to define a small circular opening 37 to confine a link of the connecting chain 17 which thus serves as a pintle about which the hooks 13 and 15 pivot when moved between the open and closed positions.

In the assembled connector, the flat hooks 13 and 15 are side-by-side, flat sides together, with the arms 21 extending in opposite directions. It will be noted in FIGURE 1 that when the hooks are in the closed position, the return lips of the hooks overlap the engaged link, so that the connector is self-biasing to the closed position under load.

When the hooks are moved to the open position, a gap 39 is provided between the ends of the arms 21 which permits insertion and removal of the hasp or links 18 into and out of the cradle 33. The hasp or link is therefore inserted at the end of the connector, rather than at a side, and the connector is therefore more convenient to use.

Movement of the hooks 13 and 15 to open and close the connector is effected by the camming plate 29, which, under the action of a compression spring 41 which surrounds the shanks 19 also serves to maintain the hooks in the closed position. The camming plate 29 comprises a generally circular disk 43 having a depending skirt flange 45 to form a seat for the upper end of the spring. The other end of this spring is seated in a somewhat similar flanged disk or end plate 47 (FIGS. 2 and 5) which is provided with a rectangular central opening to receive the superimposed hooks, and held in assembled relation with the spring and hooks by the pintle link of the chain 17, which abuts the underside of the disk 47.

The camming action of the plate 29 is provided by a pair of generally rectangular offset slot openings 49 and 51 (FIGURE 4) which lie on opposite sides of, and closely adjacent to, a diametric line of the disk, overlapping somewhat at the center of the disk. The width of each slot is slightly larger than that of the shank 19 so that the shanks slip freely in the slots. Each slot has an inner end 53 near the center of the camming plate 29, and an outer end 55 near the perimeter of the plate. The ends 53 and 55 of the slots 49 and 51 cooperate with the camming surfaces 25 and 27 to cause movement of the hooks, as hereinafter described.

The hooks 13 and 15 are held in closed position by the camming plate 29 under action of the spring 41, and are also moved between the open and closed position by vertical movement of the camming plate. Specifically, when the plate 29 is moved downwardly against the action of the spring toward the position shown in FIGURE 2, the inner ends 53 of the slots 49 and 51 ride along the forward camming surfaces 25 of the shanks 19 and cause the hooks to move apart to the open position. Conversely, when the plate 29 is moved upwardly along the shanks by the spring 41, the outer ends 55 of the slots ride along the rearward camming surfaces 27 of the shanks and cause the hooks to move toward each other to the closed position.

When not under load, the connector 11 can be opened manually by moving the pivot-link slightly to an out-of-the-way position (FIGURE 1) and placing the thumb at the bottoms of the shanks at the point designated 57 in FIGURE 1, with the fingers disposed on opposite sides of the camming plate 29, as at points designated 59 and 61 in FIGURE 4. The connector is opened by moving the thumb and fingers toward one another, as when the hand is closed, thus moving the camming plate 29 toward the end plate 47.

Conversely, when the pressure of the thumb and finger is released, the spring 41 returns the camming plate 29 to the upper position determined by the stop shoulder 31 and closes the connector in the manner above described.

The connector 11 has the advantage of being easily assembled with, or disassembled from, the end link of a chain or loop of a cable, or other similar object, upon which it may be mounted. In assembling the connector with a chain link, for example, the camming plate 29, spring 41, and end plate 47 are slipped in order over the overlapped hook shanks 19 from the pivot ends of the shanks. The spring 41 is then compressed by drawing the end plate 47 upwardly along the shanks as with the thumb against the camming plate 29 and the finger against the end plate 47 and with the camming plate 29 seated against the stop shoulders 31 of the hook shanks. As the end plate moves upwardly along the shanks, the curvature of the shanks permits the spreading of the pivot ends of the shanks sufficiently to insert the chain link into the adjacent mouths of the pivot slots 23. As the restraint on the spring is released, the slots 23 close over each other to seat the chain link in the pintle openings.

Disassembly may be accomplished by the same steps in reverse order.

It will be seen, therefore, that the connector can be readily attached to a chain or the like and the connection, once made, is permanent until the connector is subsequently disassembled. As will become obvious shortly, the connector is not subject to accidental or inadvertent disassembly.

The advantages of the present invention can best be pointed out with reference to a particular application. FIGURE 6 is a partially broken away view of a hinged light pole 63 such as is frequently used in gasoline service stations, and which also has various other industrial and commercial applications. The pole comprises generally a foundation 65, a supporting or base member 67 and a top section 69 hinged to the base about a suitable pin 71. A means 73 is provided to lock the top section 69 in the normal or upright position.

While not shown in the drawings, lighting fixtures are provided at the upper end of the top section 69 and a suitable electrical connection is made between these fixtures and a power supply in the base. The purpose of the hinging movement of the pole is to provide a convenient means of servicing the fixtures, such as cleaning the reflectors and replacing bulbs.

It will be noted that the top section 69 is approximately centrally pivoted so as to provide an upper end 75 and a lower end 77 of this section. When the upper end 75 is lowered to service the fixtures, the lower end 77 swings upwardly. In order to facilitate movement of the top section 69 back to its normal position, it is customary to attach a chain to the lower end 77 so that when the servicing has been completed, the top section may be swung back to a vertical position by pulling on the chain. A bracket or hasp 79 is provided on the lower end 77 to which the chain may be connected.

It had previously been the custom to connect the chain to the bracket 79 by means of the ordinary spring-clip type connector. However, certain difficulties were experienced with the use of this connector, as well as with others which were available, in that they frequently became disengaged from the bracket. If the connector became disengaged during movement of the top section 69 of the pole, there would be no means of retarding the downward swinging movement of the top section 75 and a hazard would be created.

Such problems have been eliminated through the use of the connectors of the present invention. Once the connector has been attached, there is no possibility of it being accidentally or inadvertently disengaged. Further, the construction of the connector is such that it will not be effected by the direction of the forces applied to it, and it will not become inoperative or ineffective as does the spring type connector when the clip becomes over-taxed.

The connector of the present invention is also advantageous over previously used connectors in that it can be easily and economically manufactured and it can be easily assembled around a chain or cable at the site of use.

While shown and described with reference to a particular embodiment, it is apparent that various changes might be made without departing from the principles of the invention.

Various of the features of the invention are set forth in the following claims.

What is claimed is:

1. A connector adapted to be mounted on a chain link or the like comprising: a pair of members adapted to form a closed loop about a cable, bar, or other chain link and, by relative movement about a common pivot, to open said loop to receive or release said cable, bar, or other chain link, each of said members having an elongated shank provided with an open ended slot extending into said shank laterally thereof; the slots in said members extending into said members from opposite directions when said members are assembled to form said loop and overlapping to define an opening to confine a link of said mounting chain or the like to form said common pivot; and retaining means surrounding said shanks to maintain the same in loop-forming relation and in assembly with the pivot-forming portion of said mounting chain or the like.

2. A connector adapted to be mounted on a chain link or the like comprising: a pair of members adapted to form a closed loop about a cable, bar, or other chain link, and, by relative movement about a common pivot, to open said loop to receive or release said cable, bar, or other chain link, each of said members having an elongated shank provided wtih an open-ended slot extending into said shank laterally thereof; the slots in said members extending into said members from opposite direction when said members are assembled to form said loop, and overlapping to define an opening to confine a link of said mounting chain or the like to form said common pivot; and retaining means to maintain the same in loop-forming relation and in assembly with the pivot-forming portion of said mounting chain or the like, said retaining means comprising a camming member surrounding said shanks and adapted to cause pivotal movement of said members into said loop-forming relation incident to movement of said plate longitudinally of said shanks away from said one end, an end plate surrounding said shanks and disposed in abutting relation to the pivot-forming portion of a link disposed in said pivot opening, and spring means interposed between said camming member and end plate to urge said member and plate apart.

3. A connector adapted to be mounted on a chain link or the like comprising: a pair of members adapted to form a closed loop about a cable, bar, or other chain link, and, by relative movement about a common pivot, to open said loop to receive or release said cable, bar, or other chain link, each of said members including a flat elongated shank having curved edges and having an open-ended slot extending into said shank laterally thereof; the slots in said members extending into said members from opposite direction when said members are assembled to form said loop and overlapping to define an opening to confine a link of said mounting chain or the like to form said common pivot; and retaining means to maintain the same in loop-forming relation and in assembly with the pivot-forming portion of said mounting chain or the like, said retaining means comprising a camming plate surrounding said shanks and adapted to cause pivotal movement of said members incident to movement of said plate longitudinally of said shanks, said plate being provided with a pair of parallel rectangular slots off-set from one another, each slot having one of said shanks in sliding relation therein, an end plate surrounding said shanks and disposed in abutting relation to the pivot-forming portion of a link disposed in said pivot opening, and spring means interposed between said camming and end plates to urge said plates apart.

4. A connector adapted to be mounted on a chain link or the like comprising: a pair of flat hook members adapted to form in facing relation a closed loop about a cable, bar, or other chain link and, by relative movement about a common pivot, to open said loop to receive or release said cable, bar, or other chain link; each of said hooks having a return lip extending past the load axis of the hook member and overlapping the like lip of the facing hook member when in loop-forming relation to lock the connector in loop-forming position under load, each of said hook members having an elongated shank provided with an open-ended slot at one end thereof extending laterally into said member; the slots in said members extending into said members from opposite directions when said members are assembled in said facing relation and over-lapping to define an opening to confine a link of said mounting chain or the like to form said common pivot; and retaining means to normally maintain the same in loop-forming relation and in assembly with the pivot-forming portion of said mounting chain or the like, said retaining means comprising a camming plate surrounding said shanks, said plate being provided with a pair of parallel rectangular slots off-set from one another, each slot having one of said shanks in sliding relation therein, whereby movement of said camming plate toward and away from said pivot opens and closes said loop, an end plate surrounding said shanks and disposed in abutting relation to the pivot-forming portion of a link disposed in said pivot opening, and a compression spring means surrounding said shanks between said camming and end plates to urge said plates apart.

References Cited in the file of this patent

UNITED STATES PATENTS

| 13,672 | Welton | Oct. 9, 1855 |
| 2,182,439 | Kalbfell | Dec. 5, 1939 |
| 2,795,024 | Donaldson | June 11, 1957 |

FOREIGN PATENTS

| 4,373 | Great Britain | Feb. 24, 1903 |